US009036701B2

(12) United States Patent
Lainema et al.

(10) Patent No.: US 9,036,701 B2
(45) Date of Patent: May 19, 2015

(54) METHOD AND APPARATUS FOR PROVIDING COMPLEXITY BALANCED ENTROPY CODING

(75) Inventors: Jani Lainema, Tampere (FI); Kemal Ugur, Tampere (FI); Antti Olli Hallapuro, Tampere (FI)

(73) Assignee: Nokia Corporation, Espoo (FI)

( * ) Notice: Subject to any disclaimer, the term of this patent is extended or adjusted under 35 U.S.C. 154(b) by 276 days.

(21) Appl. No.: 13/192,111

(22) Filed: Jul. 27, 2011

(65) Prior Publication Data

US 2012/0250763 A1    Oct. 4, 2012

Related U.S. Application Data (60) Provisional application No. 61/368,316, filed on Jul. 28, 2010.

(51) Int. Cl.
H04N 7/26        (2006.01)
H04N 19/463      (2014.01)
H04N 19/70       (2014.01)
H04N 19/13       (2014.01)

(52) U.S. Cl.
CPC ............ H04N 19/463 (2013.01); H04N 19/70 (2013.01); H04N 19/13 (2013.01)

(58) Field of Classification Search
CPC ............. H04N 7/26; H04N 19/00551; H04N 19/00884; H04N 19/00121
USPC .................................................. 375/240.08
See application file for complete search history.

(56) References Cited

U.S. PATENT DOCUMENTS

| 7,714,754 | B2 * | 5/2010 | Girardeau, Jr. ............... 341/107 |
| 8,213,499 | B2 * | 7/2012 | Hu ............................ 375/240.01 |
| 8,294,603 | B2 * | 10/2012 | Sze et al. ...................... 341/107 |
| 2002/0131506 | A1 * | 9/2002 | Kerofsky et al. ......... 375/240.23 |

(Continued)

FOREIGN PATENT DOCUMENTS

| CA | 2643705 | 10/2007 |
| WO | 2008053755 A2 | 5/2008 |
| WO | 2011075071 A1 | 6/2011 |

OTHER PUBLICATIONS

International Search Report and Written Opinion, received in corresponding Patent Cooperation Treaty Application No. PCT/IB2011/053356, dated Dec. 29, 2011, 13 pages.

(Continued)

*Primary Examiner* — Jay Patel
*Assistant Examiner* — Francis G Geroleo
(74) *Attorney, Agent, or Firm* — Alston & Bird LLP (57) ABSTRACT

A method, apparatus and computer program product are provided to enable the provision of efficient processing in the area of video coding and decoding by employing complexity balanced entropy coding in order to provide a high level of capability with respect to video coding and decoding in a cost effective manner. A method includes categorizing a plurality of syntax elements of video content into first and second categories based on a frequency of occurrence of the syntax elements in the video content. The method also entropy codes symbols that correspond to the first category of syntax elements and that have been subjected to a context update. Further, the method entropy codes symbols that correspond to the second category of syntax elements and that have bypassed context updating. A corresponding apparatus and computer program product are also provided.

20 Claims, 8 Drawing Sheets (56) References Cited

U.S. PATENT DOCUMENTS

| | | | |
|---|---|---|---|
| 2005/0179572 A1* | 8/2005 | Winger | 341/107 |
| 2008/0276078 A1 | 11/2008 | Hu | |
| 2009/0141806 A1* | 6/2009 | Marpe et al. | 375/240.24 |
| 2009/0273491 A1 | 11/2009 | Sakaguchi et al. | |
| 2011/0001643 A1 | 1/2011 | Sze et al. | |
| 2012/0014433 A1* | 1/2012 | Karczewicz et al. | 375/240.02 |

OTHER PUBLICATIONS

Ugur, Kemal, "Description of Video Coding Technology Proposal by Tandberg, Nokia, Ericsson", JCT-VC meeting; Apr. 15, 2010-Apr. 23, 2010, JCTVC-A119; whole document.

Ugur, Kemal, "High Performance Low Complexity Video Coding and the Emerging HEVC Standard", IEEE Transactions on Circuits and Systems for Video Technology, Dec. 1, 2010, vol. 20, nr. 12, pp. 1688-1697, ISSN 1051-8215.

Ugur, Kemal, "Low Complexity Video Coding and the Emerging HEVC Standard", Picture Coding Symposium 2010, Dec. 8, 2010-Dec. 12, 2010, Nagoya.

Lam, Bonnie, "Parallel Architectures for Entropy Coding in a Dual-Standard Ultra-HD Video Encoder", Massachusetts Institute of Technology, Dept. of Electrical Engineering and Computer Science, May 21, 2010; pp. 39-58; Chapter 3.

Office Action for Korean Application No. 10-2013-7005051 dated Feb. 27, 2014.

European Search Report received for corresponding European Patent Application No. 11811919.7 dated Dec. 20, 2013, 6 pages.

Vivienne et al., "A High Throughput CABAC Algorithm Using Syntax Element Partitioning", Image Processing (ICIP) 2009, 16th IEEE International Conference on IEEE, Piscataway, NJ, USA, Nov. 7, 2009, pp. 773-776.

Marpe et al., "Context-Based Adaptive Binary Arithmetic Coding in the H.264/AVC Video Compression Standard", IEEE Transactions on Circuits and Systems for Video Technology, IEEE Service Center, Piscataway, NF, US, vol. 13, No. 7, Jul. 1, 2003, pp. 620-636.

Office Action from Canadian Application 2,806,523, dated Dec. 17, 2014.

Office Action from Korean Patent Application 2013-7005051, dated Nov. 27, 2014.

* cited by examiner

METHOD AND APPARATUS FOR PROVIDING COMPLEXITY BALANCED ENTROPY CODING

RELATED APPLICATIONS

This application claims priority to U.S. Provisional Application No. 61/368,316, filed Jul. 28, 2010, which is hereby incorporated herein in its entirety by reference.

TECHNOLOGICAL FIELD

Various implementations relate generally to electronic device video coding and decoding technology and, more particularly, relate to a method and apparatus for providing complexity balanced entropy coding.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices while keeping cost and size of such devices relatively low. Due to the ubiquitous nature of mobile electronic devices, people of all ages and education levels are now utilizing mobile terminals to communicate with other individuals or contacts, receive services and/or to share information, media and other content. Thus, mobile electronic devices are also becoming popular mechanisms by which users communicate with each other and consume content.

Although the capabilities of mobile electronic devices with respect to acquiring and rendering content, enabling communication and providing services continue to improve, the fact that such devices are mobile and the market driven desire to keep such devices relatively small inevitably introduces challenges with respect to limits in battery life and processing resources. While battery life continues to improve, the pace of expansion of complexity and processing load continues to race forward. Thus, significant usage of a mobile electronic device for the services and functions described above may typically consume battery power quickly and end up forcing the user to frequently recharge the battery or limit their usage, which degrades the user experience. Accordingly, to increase user satisfaction, it is desirable to maintain high levels of capabilities in the most efficient manner possible.

BRIEF SUMMARY

A method, apparatus and computer program product are therefore provided to enable the provision of efficient processing in the area of video coding and decoding. In an example embodiment, complexity balanced entropy coding may be employed in order to provide a high level of capability with respect to video coding and decoding while keeping the costs in terms of complexity relatively low.

BRIEF DESCRIPTION OF THE DRAWING(S)

Having thus described various embodiments in general terms, reference will now be made to the accompanying drawings, which are not necessarily drawn to scale, and wherein:

DETAILED DESCRIPTION

Some embodiments will now be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments. Thus, use of any such terms should not be taken to limit the spirit and scope of various embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments may be employed on mobile terminals in order to perform video coding and decoding more efficiently. However, example embodiments may alternatively be practiced on other electronic devices including fixed terminals. As such, although reduced-complexity video coding and decoding may be particularly useful in connection with operation in resource constrained environments (e.g., mobile terminals), it should be appreciated that such complexity reductions may also be useful in other environments in which resources are not constrained.

A video codec typically includes an encoder and a decoder. The encoder may be employed for transforming a video input into a compressed representation suitable for storage and/or transmission. The decoder may be employed for uncompressing the compressed video representation back into a viewable form. In many situations, the encoder discards some information from the original video sequence in order to represent the video in a more compact form (e.g., at a lower bitrate).

Figure 6:
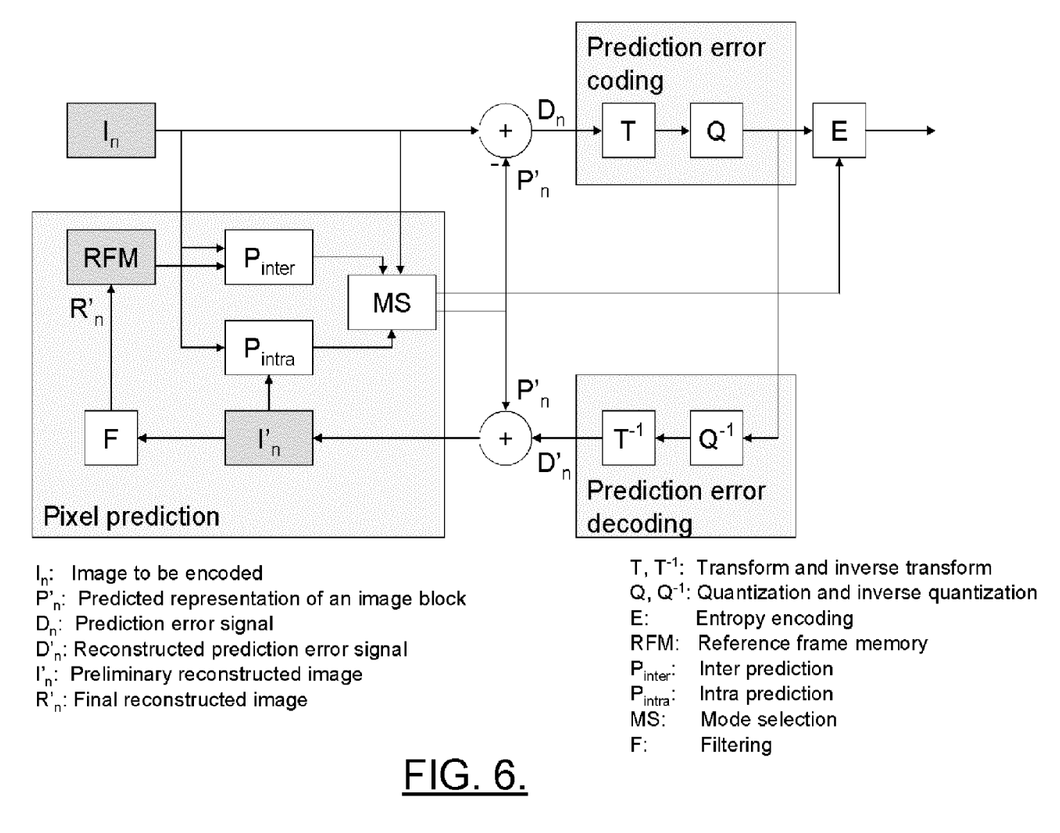
FIG. 6 illustrates structure associated with an example encoding process.

A typical hybrid video codec (e.g., ITU-T H.263 and H.264) may encode video information in two phases. In the first phase, pixel values in a certain picture area (or "block") may be predicted, for example, by motion compensation (e.g., finding and indicating an area in one of the previously coded video frames that corresponds closely to the block being coded) or by spatial means (e.g., using the pixel values around the block to be coded in a specified manner). In the second phase, the prediction error (e.g., the difference between the predicted block of pixels and the original block of pixels) is coded. The second phase typically includes transforming the difference in pixel values using a specified transform (e.g. Discrete Cosine Transform (DCT) or a variant thereof), quantizing the coefficients, and entropy coding the quantized coefficients. By varying the fidelity of the quantization process, the encoder can control the balance between the accuracy of the pixel representation (picture quality) and size of the resulting coded video representation (file size or transmission bitrate). Structure associated with the encoding process described above is illustrated, for example, in FIG. 6.

Figure 7:
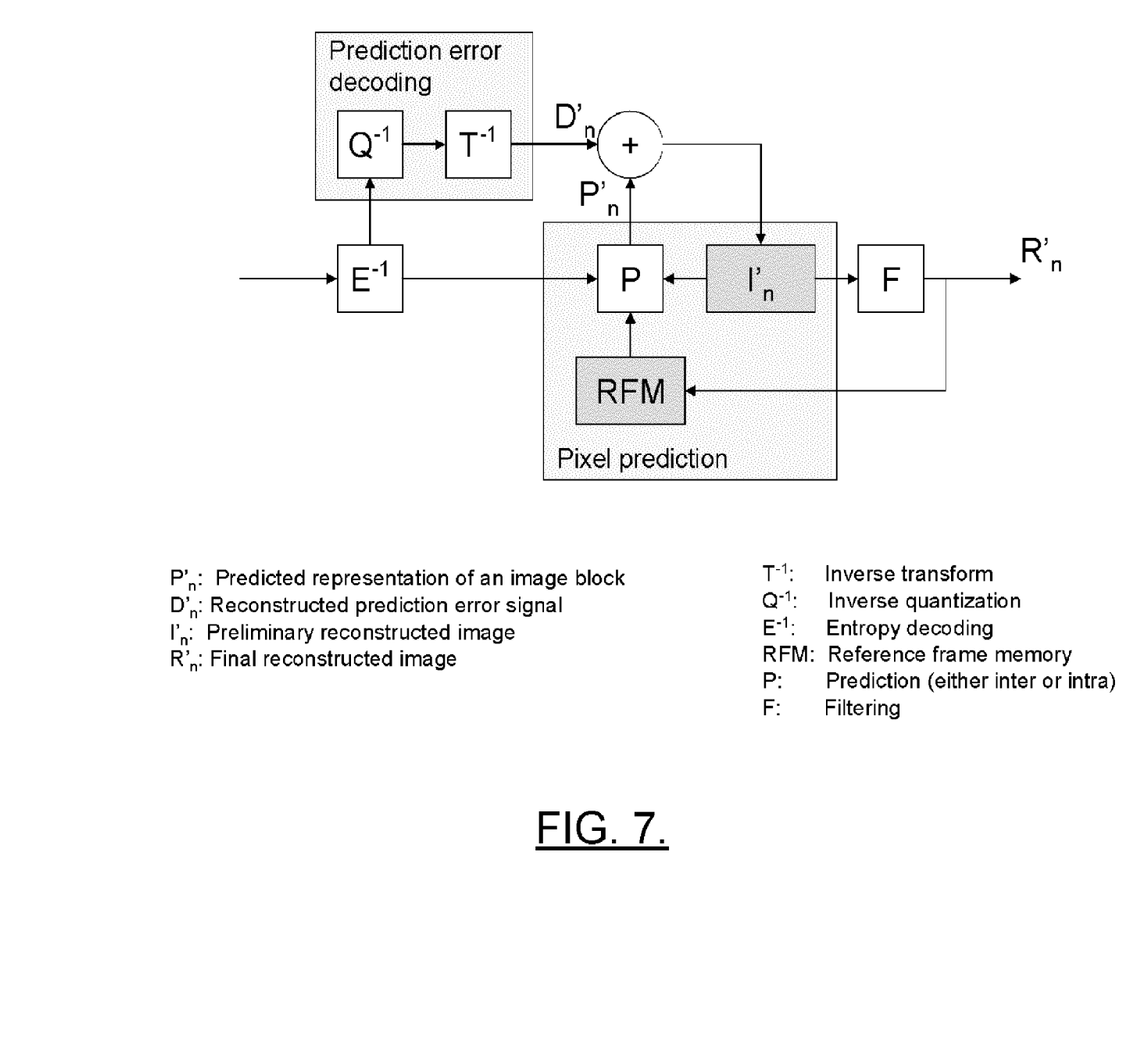
FIG. 7 illustrates structure associated with an example decoding process.

A typical decoder reconstructs the output video by applying prediction means similar to the encoder to form a predicted representation of the pixel blocks (e.g., using motion or spatial information created by the encoder and stored in the compressed representation) and prediction error decoding. The prediction error decoding may be an inverse operation of the prediction error coding recovering the quantized prediction error signal in spatial pixel domain. After applying prediction and prediction error decoding, the decoder may sum up the prediction and prediction error signals (e.g., pixel values) to form an output video frame. The decoder (and encoder) may also apply additional filtering to improve the quality of the output video before passing it for display and/or storing it as a prediction reference for the forthcoming frames in the video sequence. Structure associated with the decoding process described above is illustrated in FIG. 7.

In typical video codecs, motion information is indicated with motion vectors associated with each motion compensated image block. Each of the motion vectors represents the displacement of the image block in the picture to be coded (in the encoder side) or decoded (in the decoder side) and the prediction source block in one of the previously coded or decoded pictures. In order to represent motion vectors efficiently, the motion vectors are typically coded differentially with respect to block specific predicted motion vectors. In typical video codecs, the predicted motion vectors are created in a predefined way such as, for example, by calculating the median of the encoded or decoded motion vectors of the adjacent blocks.

In typical video codecs, the prediction residual after motion compensation is first transformed with a transform kernel (like DCT) and then coded since there may be some correlation among the residual. Thus, transform can in some cases help reduce this correlation and provide more efficient coding.

Typical video encoders utilize Lagrangian cost functions to find optimal coding modes (e.g., the desired Macroblock mode and associated motion vectors). This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R \quad \text{(Eq. 1)}$$

Where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Many video codecs define subsets of coding tools ("profiles") to be used in different use cases. This approach has the benefit of allowing different devices to implement the coding tools most appropriate for the intended usage and available resources on the implementation platform. A drawback of this approach is that there may be lost interoperability between different profiles of the codec.

Figure 8:
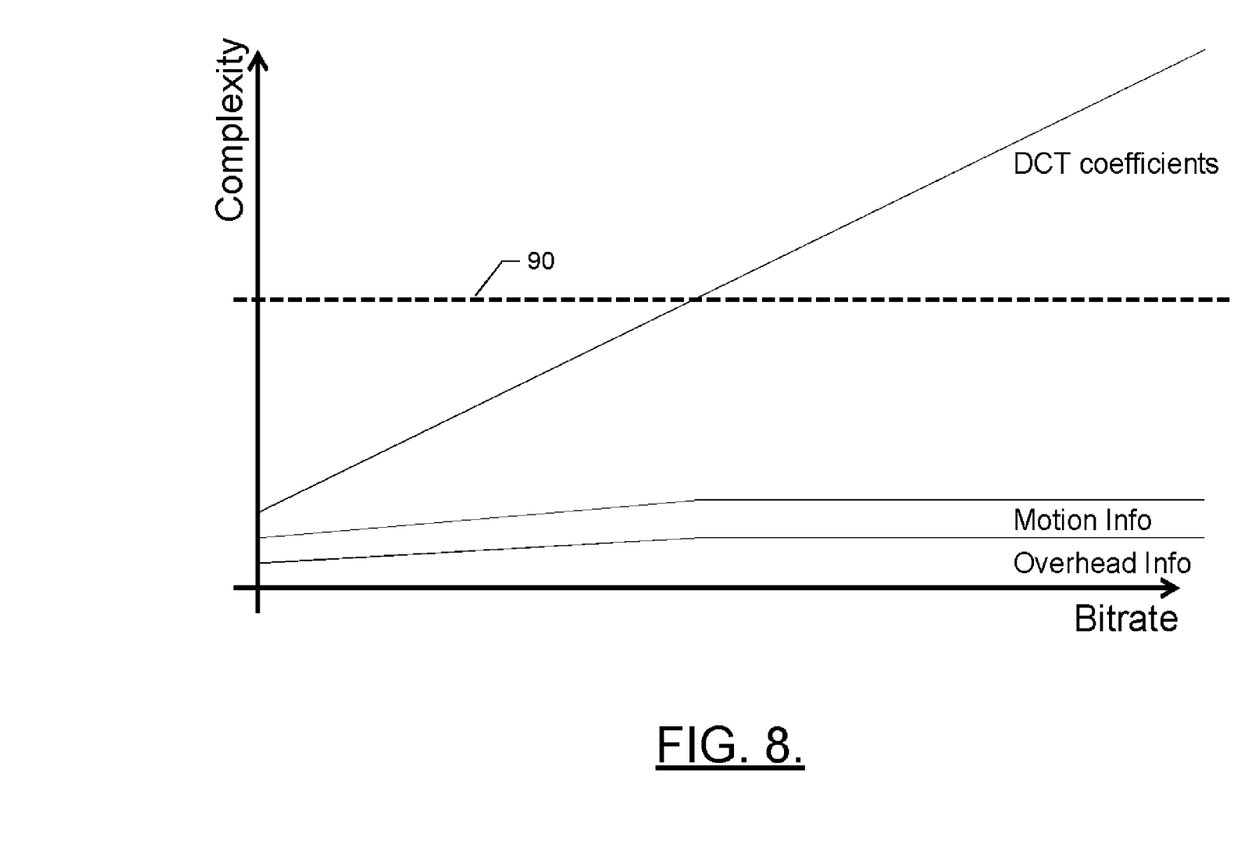
FIG. 8 illustrates a graph showing complexity versus bitrate for a conventional encoder.

General purpose video codecs, such as H.264/AVC, define coding tools with different computational requirements in different profiles of the standard. This definition may leads to situations where implementations of the same standard cannot necessarily interoperate with each other if they support a different profile of the standard. One significant reason for having multiple profiles in H.264/AVC is the entropy coding part of the standard, where some profiles support only the low complexity Context Adaptive Variable Length Coding based approach (CAVLC) whereas some other profiles support also the Context Adaptive Binary Arithmetic Coding approach (CABAC). The CABAC support is not required for the implementations of the low complexity profiles as the computational requirements of the CABAC method increase substantially as a function of the utilized bitrate. Coding and decoding of the DCT transform coefficients in the CABAC approach may cause problems in real life implementations as the computational requirements of that operation increases significantly as a function of the video bitrate as shown in FIG. 8.

Some embodiments of the present invention may provide for implementation of a coding strategy that takes advantage of variable length coding and arithmetic coding in a unified entropy coding design. The variable length coding aspects may operate to keep complexity relatively low, while the arithmetic coding aspects may help to maintain relatively high coding efficiency. The unified entropy coding design of some example embodiments may employ a single entropy coding mechanism that operates with respect to two defined categories that are defined for different syntax elements. As such, by categorizing syntax elements differently, different categories of symbols may be operated on differently in order to achieve relatively higher efficiency in a lower complexity implementation.

Figure 1:
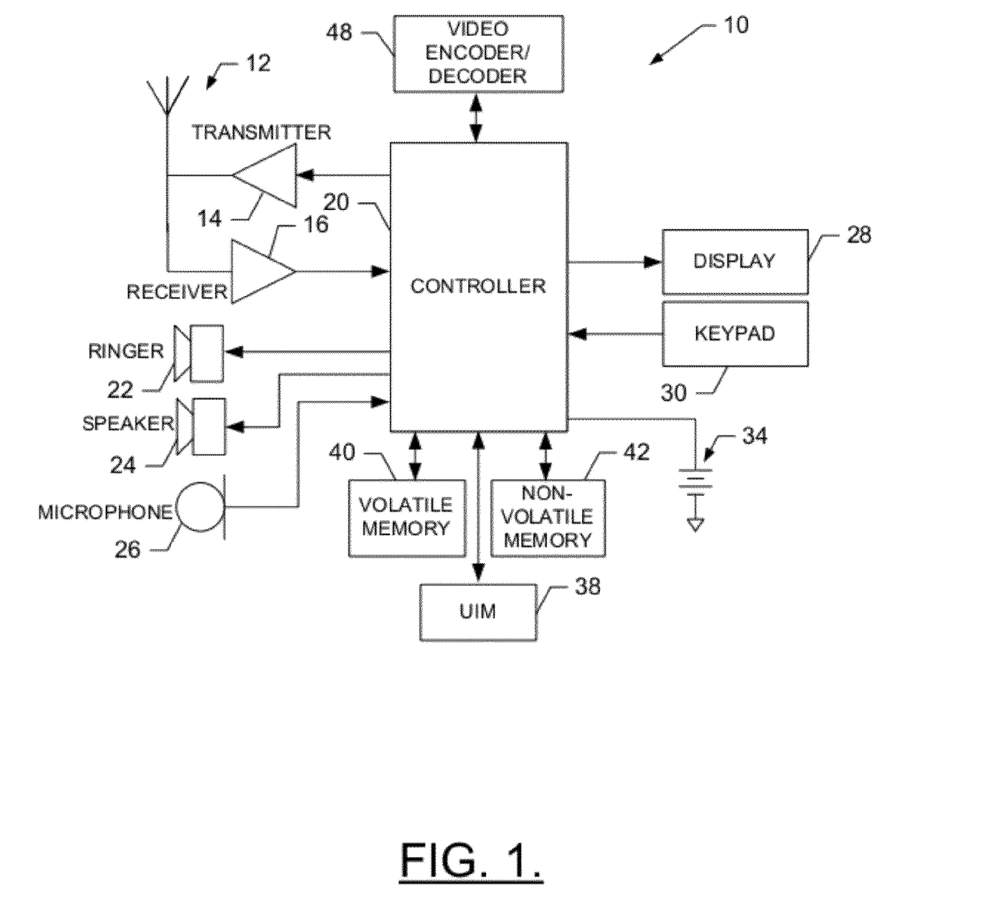
FIG. 1 is a schematic block diagram of a mobile terminal that may employ an example embodiment.

FIG. 1, one example embodiment, illustrates a block diagram of a mobile terminal 10 that would benefit from various embodiments. It should be understood, however, that the mobile terminal 10 as illustrated and hereinafter described is merely illustrative of one type of device that may benefit from various embodiments and, therefore, should not be taken to limit the scope of embodiments. As such, numerous types of mobile terminals, such as portable digital assistants (PDAs), mobile telephones, pagers, mobile televisions, gaming devices, laptop computers, cameras, video recorders, audio/ video players, radios, positioning devices (for example, global positioning system (GPS) devices), or any combination of the aforementioned, and other types of voice and text communications systems, may readily employ various embodiments.

The mobile terminal 10 may include an antenna 12 (or multiple antennas) in operable communication with a transmitter 14 and a receiver 16. The mobile terminal 10 may further include an apparatus, such as a controller 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), and the like. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10.

In some embodiments, the mobile terminal 10 may further include a video encoder/decoder 48 for performing video coding and decoding operations. The video encoder/decoder 48 may be configured to encode data by transforming video input into compressed video data and decode data by converting compressed video data back into a viewable form.

Figure 2:
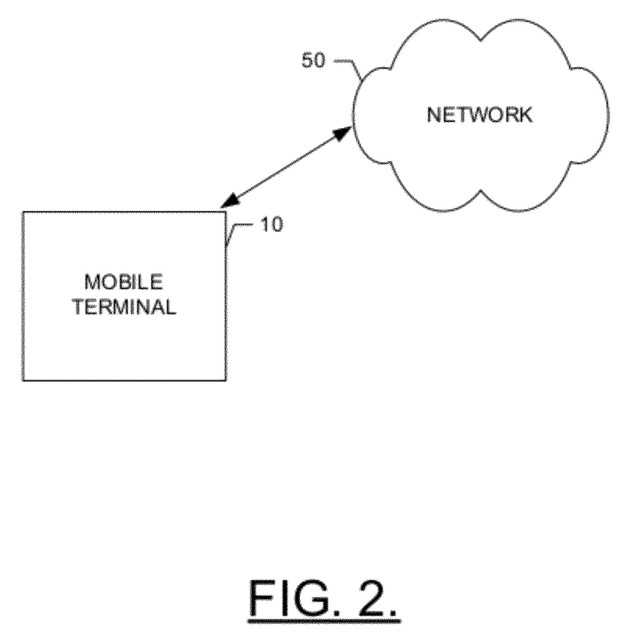
FIG. 2 is a schematic block diagram of a wireless communications system according to an example embodiment.

FIG. 2 is a schematic block diagram of a wireless communications system according to an example embodiment. Referring now to FIG. 2, an illustration of one type of system that would benefit from various embodiments is provided. As shown in FIG. 2, a system in accordance with an example embodiment includes a communication device (for example, mobile terminal 10) and in some cases also additional communication devices that may each be capable of communication with a network 50. The communications devices of the system may be able to communicate with network devices or with each other via the network 50.

In an example embodiment, the network 50 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the other communication devices may be capable of communication with each other via the network 50 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (for example, personal computers, server computers or the like) may be coupled to the mobile terminal 10 via the network 50. By directly or indirectly connecting the mobile terminal 10 and other devices to the network 50, the mobile terminal 10 and the other devices may be enabled to communicate with each other and/or the network, for example, according to numerous communication protocols including Hypertext Transfer Protocol (HTTP) and/or the like, to thereby carry out various communication or other functions of the mobile terminal 10 and the other communication devices, respectively.

Furthermore, although not shown in FIG. 2, the mobile terminal 10 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the network 50 and other communication devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

Figure 3:
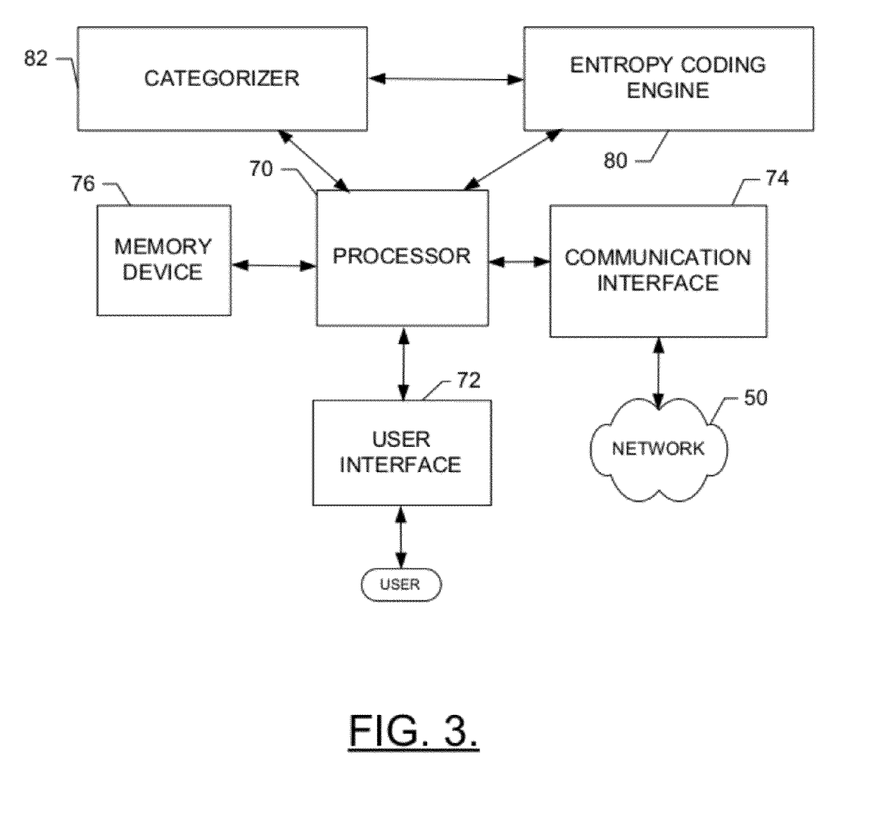
FIG. 3 illustrates a block diagram of an apparatus for providing complexity balanced entropy coding according to an example embodiment.

FIG. 3 illustrates a block diagram of an apparatus that may be employed at the mobile terminal 10 to host or otherwise facilitate the operation of an example embodiment. An example embodiment will now be described with reference to FIG. 3, in which certain elements of an apparatus for providing complexity balanced entropy coding are displayed. The apparatus of FIG. 3 may be employed, for example, on the mobile terminal 10. However, the apparatus may alternatively be embodied at a variety of other devices, both mobile and fixed (such as, for example, any of the devices listed above). Furthermore, it should be noted that the devices or elements described below may not be mandatory and thus some may be omitted in certain embodiments.

Referring now to FIG. 3, an apparatus for providing complexity balanced entropy coding is provided. The apparatus may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus may, in some embodiments, be a mobile terminal (e.g., mobile terminal 10) or a fixed communication device or computing device configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control an entropy coding engine 80 and a categorizer 82. As such, in some embodiments, the processor 70 may be said to cause, direct or control the execution or occurrence of the various functions attributed to the entropy coding engine 80 and the categorizer 82, respectively, as described herein. The entropy coding engine 80 and the categorizer 82 may each be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the entropy coding engine 80 and the categorizer 82, respectively, as described herein. Thus, in examples in which software is employed, a device or circuitry (for example, the processor 70 in one example) executing the software forms the structure associated with such means.

The categorizer 82 may be configured to divide syntax elements that may occur in a given bitstream (e.g., a bitstream associated with video content being processed) into categories. In an example embodiment, the first category includes symbols that occur relatively infrequently and the second category includes symbols that occur relatively frequently. Accordingly, for example, a threshold frequency of occurrence may be defined for symbols and those symbols that are expected to occur more frequently than the threshold frequency may be determined to be in the second category while those symbols that are expected to occur less frequently than the threshold frequency may be determined to be in the first category. In some cases, the frequency threshold may be determined based on a frequency of symbol occurrence in the highest bitrates allowed in a particular system. As such, symbols in the first category may not only occur relatively infrequently even at the highest bitrates allowed. Meanwhile, the second category may include symbols whose occurrence significantly increases as the total bitrate of a video bitstream increases.

After categorization has been accomplished by the categorizer 82, the entropy coding engine 80 may perform binarization and/or entropy coding operations employing different treatment based on the categories defined by the categorizer 82. For example, for the first category, binarization may be accomplished using a selected binarization technique (e.g., CABAC or Pipe/V2V (variable length to variable length) approaches) followed by a context update and entropy coding with variable bin probabilities. The syntax for the symbols in the second category may mimic traditional variable length coding and may be performed by binarizing symbols targeting a fifty percent probability for both 0 and 1 bins. For cases of residual coefficients, the binarized symbols may be generated similar to run-length coding, followed by Huffman coding, or using some other more advanced methods. After binarizing symbols with a targeted probability for 0 and 1 bins, the context update stage may be bypassed for the resulting bins. Entropy coding may then be performed with fifty percent probabilities. In some examples, a bypass coding mode may be implemented for a CABAC engine to accomplish the entropy coding.

For decoding, some example embodiments may process first category symbols using procedures corresponding to the encoding mechanism employed. For example, if encoding is performed using CABAC or Pipe/V2V related approaches, the corresponding decoding approaches for each may be implemented for first category symbols. Meanwhile, syntax elements belonging to the second category may employ the same coding engine (e.g., the entropy coding engine 80) as first category symbols except that static fifty percent bin probabilities may be employed in relation to decoding of these symbols (e.g., by employing a bypass coding mode of a CABAC engine).

Since context update operations are not performed for syntax elements belonging to the second category, the total computational requirements for coding/decoding operations undertaken by the codec (e.g., the video encoder/decoder 48) may be reduced. In this regard, for example, the total computational requirements may be within certain limits that may keep complexity relatively low while still enabling relatively high compression performance for the given complexity limitation. As such, in some cases, first category encoding may be structured to provide relatively high efficiency while second category encoding may be structured to provide lower complexity (e.g., by bypassing context updating). For construction of the first category, information related to quad-tree structure of coding, transform and prediction units may be considered along with information related to predication, such as a prediction mode, motion vector data and intra prediction data. Second category construction may take into account residual transform coefficient data.

Although each of the syntax elements of a given bitstream may be encoded and decoded in accordance with complexity balanced entropy coding as described above, the method and apparatus of on example embodiment may encode some of the syntax elements in accordance with complexity balanced entropy coding and others of the syntax elements in accordance with other coding schemes, such as in accordance with arithmetic coding schemes. Thus, the complexity balanced entropy coding of an example embodiment of the present invention may be utilized jointly or in combination with arithmetic or other coding schemes, if so desired.

An instance of the categorizer 82 and the entropy coding engine 80 may be provided at the video encoder/decoder 48.

Alternatively, an instance of the categorizer 82 and the entropy coding engine 80 may be separately provided, but may be available to assist with video encoding and decoding operations performed by the video encoder/decoder 48.

In some modes of operation, quantized DCT coefficients may be binarized and resulting bins may be coded with equal probabilities (e.g., fifty percent for 0 bins and fifty percent for 1 bins) utilizing the same entropy coding mechanism (e.g., entropy coding engine 80) as is used for the rest of the data. The data may be encoded by any selected mechanism (e.g., CABAC in H.264/AVC). When compared to binarization of, for example, CABAC, the binarization of DCT coefficients may be performed differently targeting the resulting bins to have equal probabilities. Consequently, when allocating equal probabilities to the bins resulting from the DCT coefficients, the most complex part of the context adaptive arithmetic coding (e.g., the updating of probabilities for different bin contexts) may be bypassed completely. This may make the computational complexity associated with entropy coding of the corresponding symbols much less dependent on the bitrate and allow a low complexity operation to be realized, even at relatively high bitrates.

Figure 4:
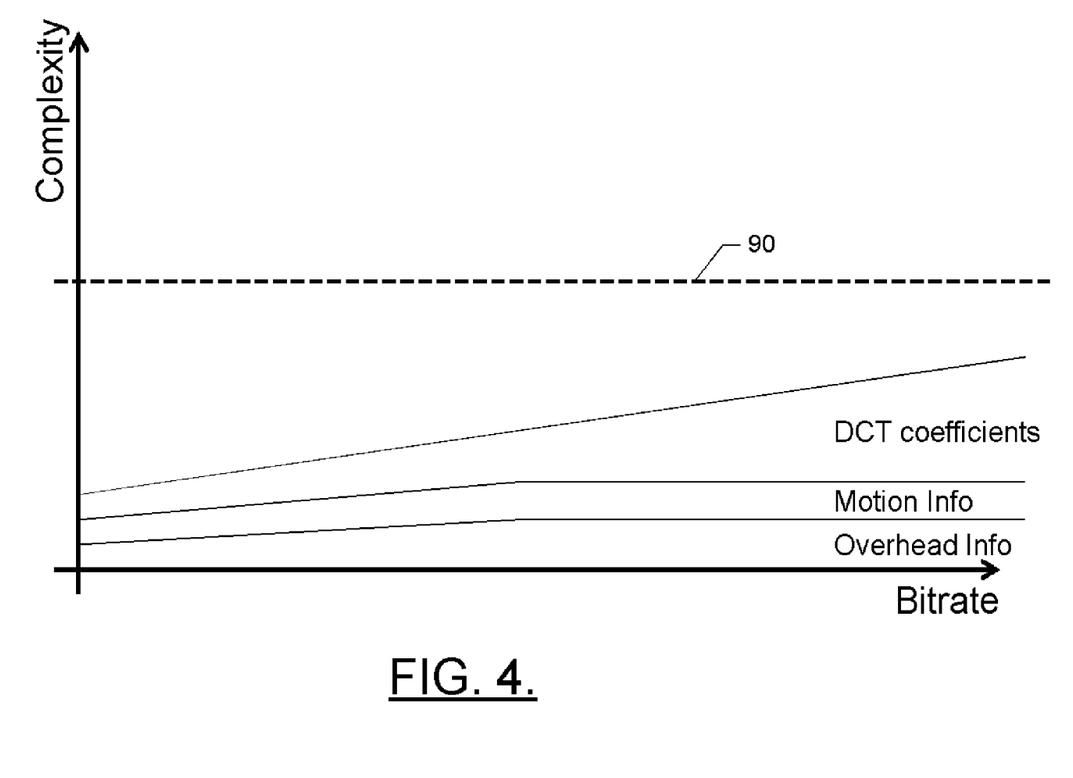
FIG. 4 illustrates a graph showing complexity versus bitrate provided by an example embodiment.

FIG. 4 illustrates an example of complexity versus bitrate for an example embodiment. The dashed line 90 may indicate a desired maximum level for a low complexity mode of operation. As indicated in FIG. 4, by employing an example embodiment that categorizes syntax elements and then encodes each category differently to reduce complexity, the computational complexity as indicated by the number of DCT coefficients, is kept below the desired maximum level by utilizing context adaptive arithmetic coding while bypassing probability estimation for DCT coefficient data for some symbols. As such, FIG. 4 stands in contrast to computational complexity as a function of video bitrate for a conventional system utilizing only context adaptive arithmetic coding as shown in FIG. 8. In FIG. 8, the number of DCT coefficients is higher and increases linearly as the bitrate increases to the point where the desired maximum complexity level for a low complexity mode of operation (shown again by dashed line 90) is exceeded.

Example embodiments of the present invention may be implemented in various different ways. As an example, binarization of data symbols may be accomplished utilizing codewords defined for DCT coefficient coding or via other mechanisms. Different context adaptive entropy coding mechanisms may also be employed (e.g., CABAC, Pipe/V2V, etc.). Different data units may be categorized for low complexity processing with constant probabilities as well. In some cases, constant probabilities in low complexity processing categories may be defined as equal probabilities (as described above). However, in some alternative embodiments, the probabilities may be defined such that one or more bins are coded with unequal probabilities. The categorization of data for low complexity processing and high complexity processing may vary depending on different variables, such as bitrate. In some embodiments, categorization of syntax elements may be signaled at block, slice, picture, or sequence levels. In some cases, an indication as to whether corresponding syntax elements are to be entropy coded with high efficiency or low complexity entropy coding may be signaled at block, slice, picture, or sequence levels as well.

Some embodiments of the present invention may therefore enable complexity of a video codec to be controlled while still enabling a relatively high level of compression efficiency under different computational complexity requirements. In this regard, by categorizing the syntax elements based on their relative frequencies of occurrence, more complex operations may be performed with respect to less frequently occurring symbols and complex operations may be simplified or omitted with respect to more frequently occurring symbols.

Figure 5:
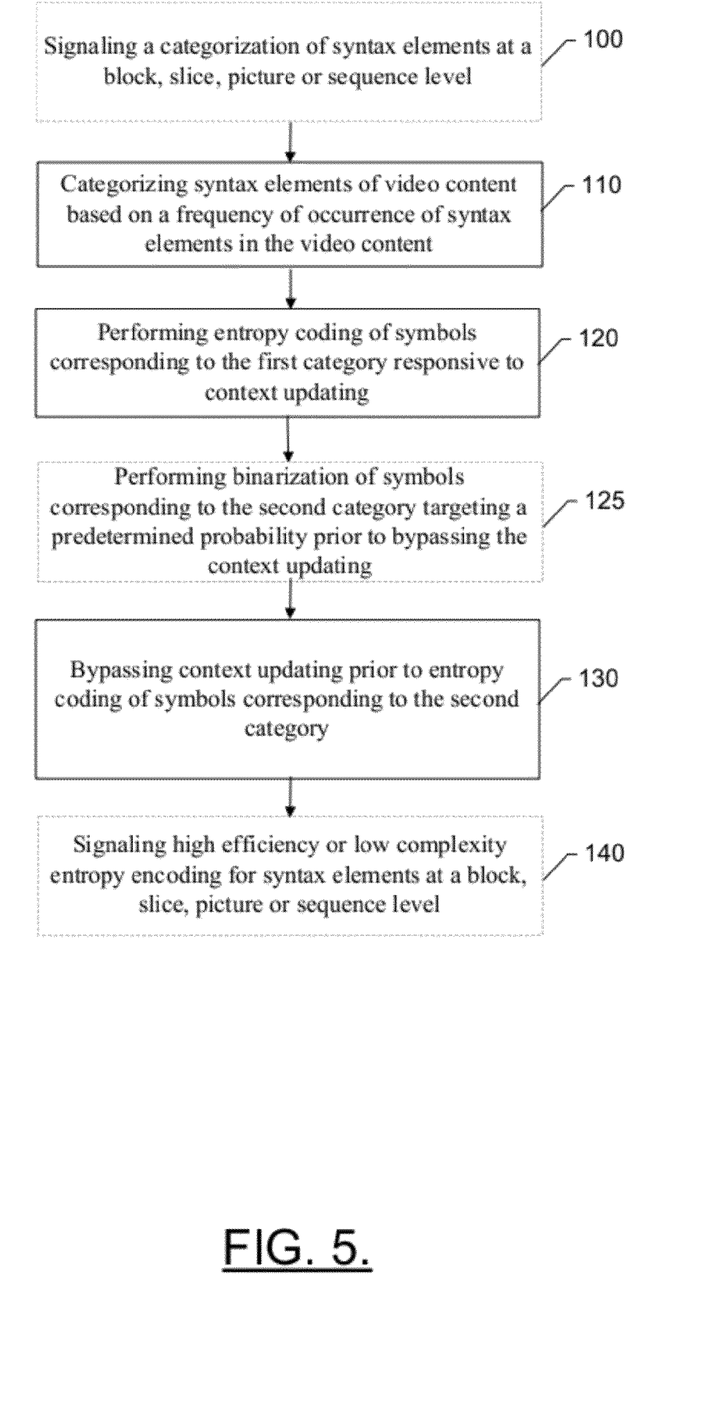
FIG. 5 is a flowchart according to another example method for providing complexity balanced entropy coding according to an example embodiment.

FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 5, may include categorizing syntax elements of video content based on a frequency of occurrence of syntax elements in the video content at operation 110. The categorizing may include defining at least a first category and a second category of symbols. The method may further include performing entropy coding of symbols corresponding to the first category responsive to context updating at operation 120, and bypassing context updating prior to entropy coding of symbols corresponding to the second category at operation 130.

In some embodiments, certain ones of the operations above may be modified or further amplified as described below. Moreover, in some embodiments additional optional operations may also be included (examples of which are shown in dashed lines in FIG. 5). It should be appreciated that each of the modifications, optional additions or amplifications below may be included with the operations above either alone or in combination with any others among the features described herein. In this regard, for example, the method may further include performing binarization of symbols targeting a predetermined probability prior to bypassing the context updating at operation 125. In an example embodiment, performing binarization of symbols targeting a predetermined probability may include performing binarization targeting an even or uneven probability for each bin. The method may further include signaling high efficiency or low complexity entropy encoding for syntax elements at a block, slice, picture or sequence level at operation 140. In some cases, the method may additionally or alternatively include signaling a categorization of syntax elements at a block, slice, picture or sequence level at operation 100. In an example embodiment, categorizing syntax elements may include categorizing symbols having a frequency of occurrence below a threshold as first category symbols and categorizing symbols having a frequency of occurrence above the threshold as second category symbols. In an example embodiment, performing entropy coding of symbols corresponding to the first category further may include performing entropy coding following binarization of the data symbols.

In an example embodiment, an apparatus for performing the method of FIG. 5 above may comprise a processor (e.g., the processor 70) configured to perform some or each of the operations (100-140) described above. The processor may, for example, be configured to perform the operations (100-140) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-140 may comprise respective ones of, for example, the categorizer 82 and the entropy coding engine 80. Additionally or alternatively, at least by virtue of the fact that the processor 70 may be configured to control or even be embodied as the categorizer 82 and the entropy coding engine 80, the processor 70 and/or a device or circuitry for executing instructions or executing an algorithm for processing information as described above may also form example means for performing operations 100-140.

An example of an apparatus according to an example embodiment may include at least one processor and at least one memory including computer program code. The at least one memory and the computer program code may be configured to, with the at least one processor, cause the apparatus to perform the operations 100-140 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 100-140 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining a frequency of occurrence threshold based on an expected frequency of occurrence of syntax elements in a bit stream;
   categorizing a plurality of syntax elements of video content into first and second categories based on the frequency of occurrence threshold, wherein syntax elements which occur greater than the frequency of occurrence threshold are categorized into the first category and syntax elements which occur less than the frequency of occurrence are categorized into the second category;
   entropy coding symbols that correspond to the first category of syntax elements and that have been subjected to a context update; and
   entropy coding symbols that correspond to the second category of syntax elements and that have bypassed context updating.

2. A method according to claim 1 further comprising causing a categorization of the syntax elements to be signaled at a block, slice, picture or sequence level.

3. A method according to claim 1 further comprising performing binarization of the symbols that correspond to the second category of syntax elements prior to bypassing the context updating.

4. A method according to claim 3 wherein performing binarization comprises performing binarization so as to target a predetermined probability.

5. A method according to claim 1 further comprising causing an indication of the entropy coding to be signaled at a block, slice, picture or sequence level.

6. A method according to claim 1 wherein categorizing the plurality of syntax elements comprises categorizing the plurality of syntax elements based on a relationship of the frequency of occurrence of the syntax elements to a predefined threshold.

7. A method according to claim 1 further comprising performing binarization of the symbols that correspond to the first category of syntax elements prior to entropy coding the symbols that correspond to the first category of syntax elements.

8. An apparatus comprising at least one processor and at least one memory including computer program code, the at least one memory and the computer program code configured to, with the processor, cause the apparatus to at least:
   determine a frequency of occurrence threshold based on an expected frequency of occurrence of syntax elements in a bit stream;
   categorize a plurality of syntax elements of video content into first and second categories based on the frequency of occurrence threshold, wherein syntax elements which occur greater than the frequency of occurrence threshold are categorized into the first category and syntax elements which occur less than the frequency of occurrence are categorized into the second category;
   entropy code symbols that correspond to the first category of syntax elements and that have been subjected to a context update; and
   entropy code symbols that correspond to the second category of syntax elements and that have bypassed context updating.

9. An apparatus according to claim 8 wherein the at least one memory and the computer program code are further configured to, with the processor, cause the apparatus to cause a categorization of the syntax elements to be signaled at a block, slice, picture or sequence level.

10. An apparatus according to claim 8 wherein the at least one memory and the computer program code are further configured to, with the processor, cause the apparatus to perform binarization of the symbols that correspond to the second category of syntax elements prior to bypassing the context updating.

11. An apparatus according to claim 10 wherein the at least one memory and the computer program code are configured to, with the processor, cause the apparatus to perform binarization by performing binarization so as to target a predetermined probability.

12. An apparatus according to claim 8 wherein the at least one memory and the computer program code are further configured to, with the processor, cause the apparatus to cause an indication of the entropy coding to be signaled at a block, slice, picture or sequence level.

13. An apparatus according to claim 8 wherein the at least one memory and the computer program code are configured to, with the processor, cause the apparatus to categorize the plurality of syntax elements by categorizing the plurality of syntax elements based on a relationship of the frequency of occurrence of the syntax elements to a predefined threshold.

14. An apparatus according to claim 8 wherein the at least one memory and the computer program code are further configured to, with the processor, cause the apparatus to perform binarization of the symbols that correspond to the first category of syntax elements prior to entropy coding the symbols that correspond to the first category of syntax elements.

15. A computer program product comprising at least one non-transitory computer-readable storage medium having computer-executable program code instructions stored therein, the computer-executable program code instructions comprising program code instructions to:
  determine a frequency of occurrence threshold based on an expected frequency of occurrence of syntax elements in a bit stream;
  categorize a plurality of syntax elements of video content into first and second categories based on the frequency of occurrence threshold, wherein syntax elements which occur greater than the frequency of occurrence threshold are categorized into the first category and syntax elements which occur less than the frequency of occurrence are categorized into the second category;
  entropy code symbols that correspond to the first category of syntax elements and that have been subjected to a context update; and
  entropy code symbols that correspond to the second category of syntax elements and that have bypassed context updating.

16. A computer program product according to claim 15 wherein the computer-executable program code instructions further comprise program code instructions to cause a categorization of the syntax elements to be signaled at a block, slice, picture or sequence level.

17. A computer program product according to claim 15 wherein the computer-executable program code instructions further comprise program code instructions to perform binarization of the symbols that correspond to the second category of syntax elements prior to bypassing the context updating.

18. A computer program product according to claim 17 wherein the comprise program code instructions to perform binarization comprise program code instructions to perform binarization so as to target a predetermined probability.

19. A computer program product according to claim 15 wherein the computer-executable program code instructions further comprise program code instructions to cause an indication of the entropy coding to be signaled at a block, slice, picture or sequence level.

20. A computer program product according to claim 15 comprise the program code instructions to categorize the plurality of syntax elements comprise program code instructions to categorize the plurality of syntax elements based on a relationship of the frequency of occurrence of the syntax elements to a predefined threshold.

* * * * *

UNITED STATES PATENT AND TRADEMARK OFFICE
CERTIFICATE OF CORRECTION

PATENT NO.         : 9,036,701 B2
APPLICATION NO.    : 13/192111
DATED              : May 19, 2015
INVENTOR(S)        : Lainema et al.

It is certified that error appears in the above-identified patent and that said Letters Patent is hereby corrected as shown below:

In the claims:

Column 14,
Lines 14 and 57, "first category" should read --second category--.
Lines 16 and 59, "second category" should read --first category--.

Column 16,
Line 5, "first category" should read --second category--.
Line 7, "second category" should read --first category--.

Signed and Sealed this
Fifth Day of April, 2016

Michelle K. Lee
*Director of the United States Patent and Trademark Office*